United States Patent
Rouhana et al.

(10) Patent No.: US 8,139,264 B2
(45) Date of Patent: Mar. 20, 2012

(54) SYSTEM AND METHOD OF OVERWRITING IMAGE DATA WITH RANDOM PATTERNS

(75) Inventors: Fadi Rouhana, Fairport, NY (US);
Larry Kovnat, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 988 days.

(21) Appl. No.: 11/467,454

(22) Filed: Sep. 21, 2006

(65) Prior Publication Data
US 2008/0074711 A1    Mar. 27, 2008

(51) Int. Cl.
*H04N 1/40* (2006.01)
*G06K 15/00* (2006.01)

(52) U.S. Cl. .................................. 358/1.9; 358/1.16

(58) Field of Classification Search ............... 358/1.15, 358/1.14, 1.16, 1.9, 1.13; 711/100, 163, 711/164, 193

See application file for complete search history.

(56) References Cited

U.S. PATENT DOCUMENTS

| | | | |
|---|---|---|---|
| 4,047,008 A * | 9/1977 | Perkins | 708/250 |
| 6,212,600 B1 * | 4/2001 | Friedman et al. | 711/112 |
| 6,577,313 B1 * | 6/2003 | Suzuki et al. | 345/619 |
| 6,731,447 B2 * | 5/2004 | Bunker et al. | 360/60 |
| 6,898,288 B2 * | 5/2005 | Chui | 380/278 |
| 7,349,118 B2 * | 3/2008 | Zipprich et al. | 358/1.16 |
| 7,936,467 B2 * | 5/2011 | Shimizu | 358/1.15 |
| 2001/0025343 A1 * | 9/2001 | Chrisop et al. | 713/193 |
| 2004/0114182 A1 * | 6/2004 | Davis | 358/1.16 |
| 2004/0114265 A1 * | 6/2004 | Talbert | 360/60 |
| 2005/0151997 A1 * | 7/2005 | Murakami et al. | 358/1.16 |
| 2005/0275892 A1 * | 12/2005 | Obata et al. | 358/1.16 |
| 2006/0015756 A1 * | 1/2006 | Chrisop et al. | 713/193 |
| 2006/0177065 A1 * | 8/2006 | Halbert | 380/277 |
| 2007/0047395 A1 * | 3/2007 | Skeeter et al. | 369/30.04 |

\* cited by examiner

*Primary Examiner* — Charlotte M Baker
(74) *Attorney, Agent, or Firm* — MH2 Technology Law Group LLP

(57) ABSTRACT

A method and apparatus for overwriting image data in an image forming apparatus. The image forming apparatus includes an image control unit having a central processing unit and an image control unit for receiving image data. The image control unit stores image data on a non-volatile storage apparatus. A memory includes an overwrite application program for generating a string of random numbers and overwriting the image data with patterns from the string of random numbers.

17 Claims, 4 Drawing Sheets

SYSTEM AND METHOD OF OVERWRITING IMAGE DATA WITH RANDOM PATTERNS

FIELD OF THE INVENTION

The present invention is related to overwriting image data stored by an image forming apparatus and, more particularly, to a system and method of overwriting image data using random patterns.

BACKGROUND OF THE INVENTION

An image forming apparatus, such as a copying machine, a printer, a facsimile machine, or a multifunction machine reads image data from an image reading apparatus or receives image data from a network. The image data can be temporarily stored into non-volatile storage apparatus having large a storage capacity, such as a hard disk drive. The image data stored in the non-volatile storage apparatus is read out, and a predetermined image processing operation is carried out such as, for example, formatting the images for printing.

Once the image data is read out, the image data on the non-volatile storage apparatus can be overwritten. In certain environments, such as high security environments, it is desirable to overwrite the image data so that it cannot be recovered by a third party once it is read out. Known methods for overwriting image data, however, typically involve overwriting the image data with fixed overwrite patterns.

Unfortunately, these overwrite patterns can be discovered and the image data can then be recovered from the non-volatile storage apparatus. Thus, there is a risk that sensitive image data can be recovered from the image forming apparatus using known overwrite methods.

Accordingly, it would be desirable to provide an image forming apparatus that securely overwrites image data. It may also be desirable to provide an image forming apparatus that overwrites its image data in a manner that prevents subsequent recovery.

SUMMARY OF THE INVENTION

In accordance with the invention, there is provided a method and apparatus for overwriting image data. An image forming apparatus, such as a copying machine, a printer, a facsimile machine, or a multifunction machine, includes an image control unit. The image control unit includes a central processing unit and an image input control unit for receiving image data. The image control unit stores image data on a non-volatile storage apparatus, such as a hard disk drive. A memory includes an overwrite application program for generating a string of random numbers and overwriting the image data with patterns from the string of random numbers.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Embodiments of the present invention provide methods and systems for preventing the recovery of stored images. In particular, once an image forming apparatus has completed its use of an image, that image is overwritten in non-volatile storage or memory by an image overwrite application. The image overwrite application employs a string of random numbers and then overwrites the image using values derived from the string of random numbers. In some embodiments, the image overwrite application may also perform multiple passes of overwriting an image.

Reference will now be made in detail to the exemplary embodiments of the invention, examples of which are illustrated in the accompanying drawings. Wherever possible, the same reference numbers will be used throughout the drawings to refer to the same or like parts.

Figure 1:
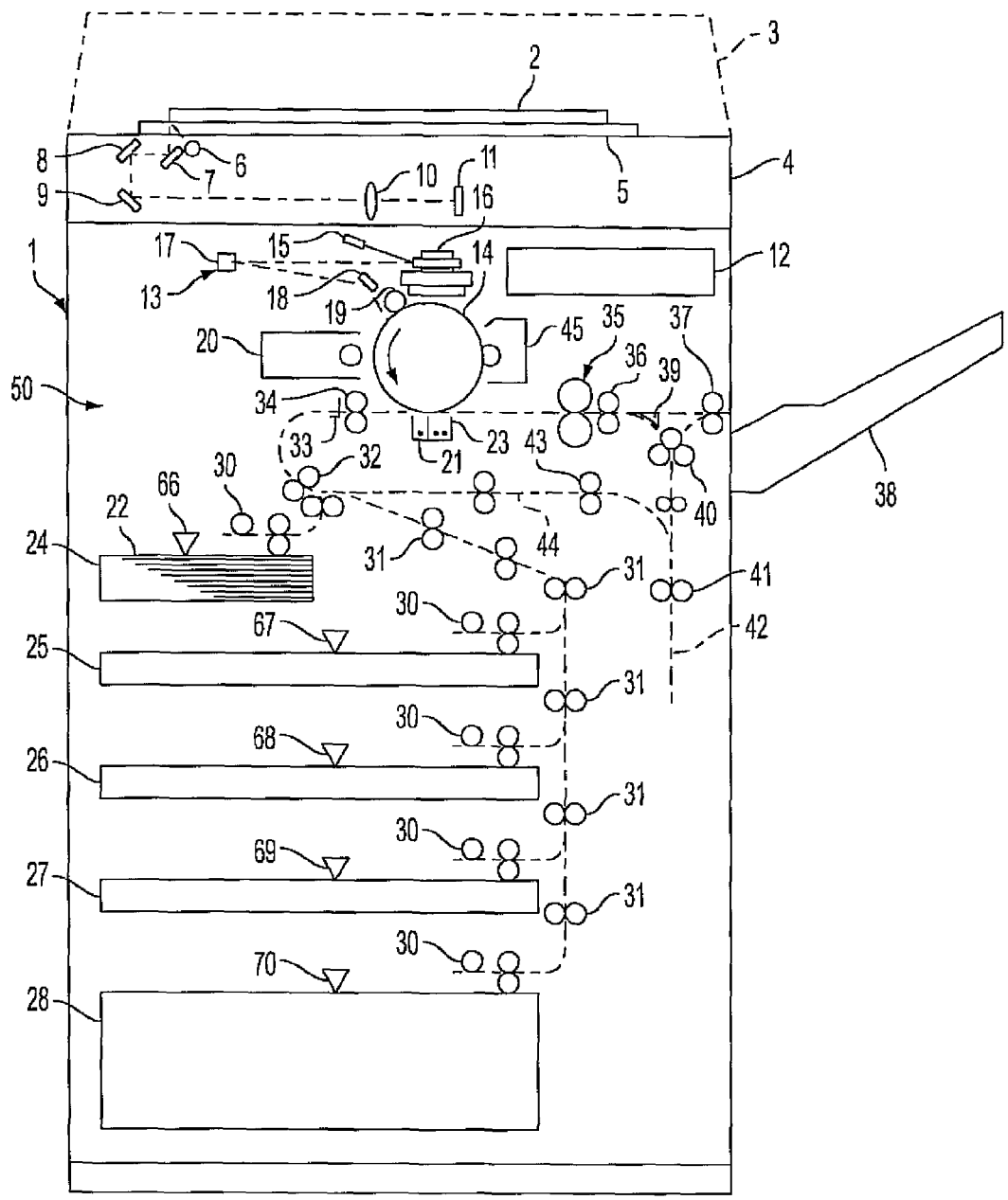
FIG. 1 depicts a block diagram of an exemplary embodiment of an image forming apparatus, in accordance with systems and methods consistent with the present invention.

FIG. 1 depicts a block diagram of an exemplary embodiment of an image forming apparatus, in accordance with systems and methods consistent with the present invention. In this embodiment, image forming apparatus 1 is a digital multifunction machine that can switch between a copy mode, a print mode, and a facsimile ("FAX" mode). Digital multifunction machines are well known to those skilled in the art. Additional embodiments of an image forming apparatus can include a copying machine, a printer, or a facsimile machine.

Referring to the digital multifunction machine, in the copy mode, an image of an original is read by an image reading apparatus, and then, the image of the original read by this image reading apparatus is copied. In the print mode, an image is printed based upon image data transmitted from a host computer, or the like, such as a personal computer. In the FAX mode, an image of an original is read by using an image reading apparatus to transmit the read image data of the original, or image data transmitted via a telephone line is printed.

Image forming apparatus 1 may include an auto document feeder (ADF) 3 and an image reading apparatus 4 in its upper portion. ADF 3 automatically transports a plurality of originals 2 to image reading apparatus 4. Image reading apparatus 4 reads an image of original 2 transported by ADF 3 as follows. Original 2 mounted on a platen glass 5 is illuminated by a light source 6; an image reflected from original 2 is scanned/exposed via an image compressing optical system onto an image reading element 11 so as to be optically read. The image compressing optical system includes a full rate mirror 7, half rate mirrors 8 and 9, and an imaging lens 10. Also, image forming apparatus 1 includes a printer 50 for forming an image on a paper in print mode, copy mode, and FAX mode.

Image data of original 2 read by image processing apparatus 4 can be stored in a non-volatile storage apparatus, such as a hard disk drive, contained in image control unit 12. In addition, any image data received over a network (not shown) can also be stored in a non-volatile storage apparatus. Image control unit 12 performs an image processing operation on the image data and sends it to printer 50.

In printer 50, an image is exposed on a photosensitive drum 14 by an ROS (Raster Output Scanner) 13 in response to the image data to which the image process operation has been performed, so that an electrostatic latent image is formed. ROS 13 is made up of a semiconductor laser 15, a polygon mirror 16, and mirrors 17 and 18. Semiconductor laser 15 emits a laser beam in response to image information. Polygon mirror 16 scans the laser beam emitted from semiconductor laser 15. Mirrors 17 and 18 expose such a laser beam scanned by polygon mirror 16 on photosensitive drum 14. Photosensitive drum 14 is uniformly charged at a predetermined potential of a predetermined polarity by a primary charging device 19 constructed of a charging roller, corotron, and the like, prior to the image expositing operation by ROS 13. Thereafter, the image of original 2 is exposed to charged photosensitive drum 14 by ROS 13, so that an electrostatic latent image is formed. The electrostatic latent image formed on photosensitive drum 14 is developed by developing apparatus 20 to become a toner image. The toner image is transferred into recording paper 22 functioning as a recording medium by being charged by a transfer corotron 21, and also, the recording paper 22 to which this toner image has been transferred is separated from photosensitive drum 14 by a discharge operation by a separating corotron 23. Recording paper 22 to which the toner image has been transferred from photosensitive drum 14 is supplied by paper supply roller 30 from any one of paper supply trays 24, 25, 26, 27, 28, and is once transported up to registration gate 33 via transport roller 31 and pre-registration roller 32, and then is stopped. Recording paper 22 passes through registration gate 33, and is transported to a surface of photosensitive drum 14 by register roller 34. Registration gate 33 is opened in synchronism with the toner image formed on the surface of photosensitive drum 14. Register roller 34 is arranged on the down stream side of registration gate 33. After the toner image formed on the surface of photosensitive drum 14 has been transferred to recording paper 22, recording paper 22 is separated from the surface of photosensitive drum 14. In some embodiments, image forming apparatus 1 can transport the recording paper 22 in a high speed.

Recording paper 22 separated from the surface of the photosensitive drum 14 is transported to fixing apparatus 35, which fixes the toner image on recording paper 22 using either heat or pressure. In a simplex copying operation, recording paper 22 on which this toner image has been fixed is directly ejected onto an ejection tray 38 by exit roller 36 of fixing apparatus 35 and by ejection roller 37.

In a duplex copying operation, recording paper 22 in which the toner image has been fixed to the single plane is transported to an inversion path 42 by tri-roller 40 and inverting roller 41. In tri-roller 40, three rollers make contact with each other under pressure. Then, recording paper 22 is transported to path 44 for duplex copying operation by both inverting roller 41, rotated along the opposite direction, and duplex roller 43. Recording paper 22 is transported from path 44 for duplex copying via pre-register roller 32 up to register gate 33, and then is stopped. Recording paper 22 is transported in synchronism with the toner image formed on photosensitive drum 14 by register gate 33 and register roller 34, and a transfer/fixing step of the toner image is carried out, then recording paper 22 is ejected to ejection tray 38 by ejection roller 37.

After the transfer step of the toner image, residual toners, paper powder, and the like are removed from the surface of photosensitive drum 14 by cleaning apparatus 45, thus preparing the photosensitive drum 14 surface for the next image forming step.

Figure 2:
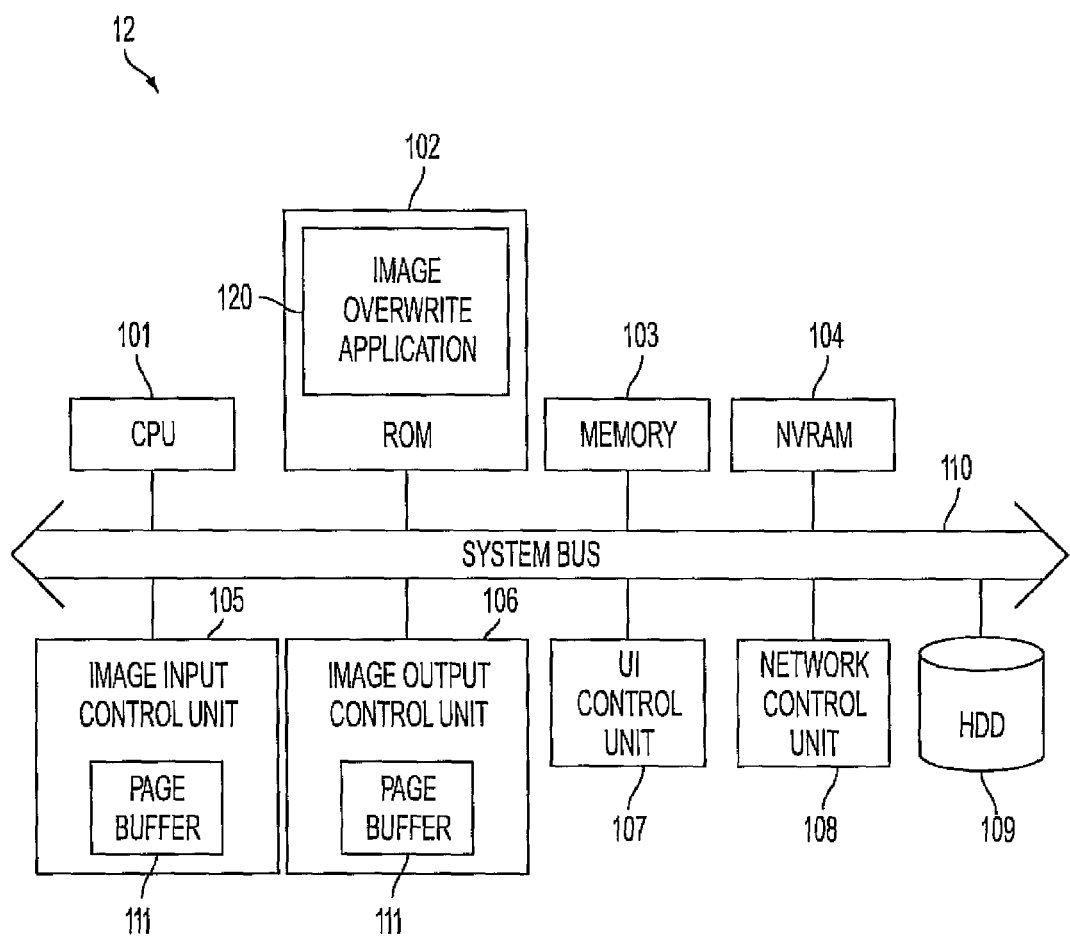
FIG. 2 depicts block diagram of an exemplary embodiment of an image control unit for controlling an image forming apparatus, in accordance with systems and methods consistent with the present invention.

FIG. 2 depicts block diagram of an exemplary embodiment of an image control unit for controlling an image forming apparatus, in accordance with systems and methods consistent with the present invention. Image control unit 12 includes the following elements. CPU 101 controls operations of image forming apparatus 1 (FIG. 1). Read-Only Memory ("ROM") 102 stores programs including image overwrite program 120 for execution by CPU 101. Memory 103 stores a parameter and the like, used to execute a control operation by CPU 101. Non-volatile Random-Access Memory ("NVRAM") 104 stores a parameter and the like, used to execute control operation by the CPU 101.

Image input control unit 105 functions as an image input unit for controlling an input operation of an image. Image output control unit 106 functions as an image output unit for controlling an output operation of an image; user interface (UI) control unit 107 controls a user interface. Network control unit 108 controls a communication operation via a network (not shown) to which the digital multifunction machine is connected; a hard disk drive (HDD) 109 functions as a non-volatile storage apparatus; a system bus 110 connects the above-described CPU 101, ROM 102, and the like to each other. Page buffers 11 may also be provided in both the image input control unit 105 and the image output control unit 106 and may be used to temporarily store image data in the unit of a page. Multifunction machine 1 can also connect to a network (not shown) such as a LAN (Local Area Network), a telephone line to a personal computer (not shown), the Internet, and the like through network control unit 108.

A user interface, through UI control unit 107, selects the print mode, the copy mode, the FAX mode, or the like, executed by image forming apparatus 1. Depending on the mode selected, UI control unit 107 selects a paper supply tray for supplying a paper to be printed, selects a total printing number, or selects magnification of a copying operation. UI control unit 107 can also start a printing operation, or the like.

In one embodiment, ROM 102 includes image overwrite application 120 for overwriting image data stored on HDD 109. Image overwrite application 120 instructs HDD 109 to overwrite image data stored on HDD 109. Image overwrite application 120 can be invoked automatically or manually by a user through UI control unit 107. In addition, image overwrite application 120 may be applied to all images or to selected images depending on various configurations settings. For example, the user may specifically request that the images for a document, such as a sensitive document, be overwritten to ensure that it cannot be recovered. Alternatively, the user may configure image overwrite application 120 to overwrite images based on an image's category or class. One skilled in the art will recognize that other variations for determining how images are overwritten by image overwrite application 120 may be employed in various embodiments of the present invention.

Figure 3:
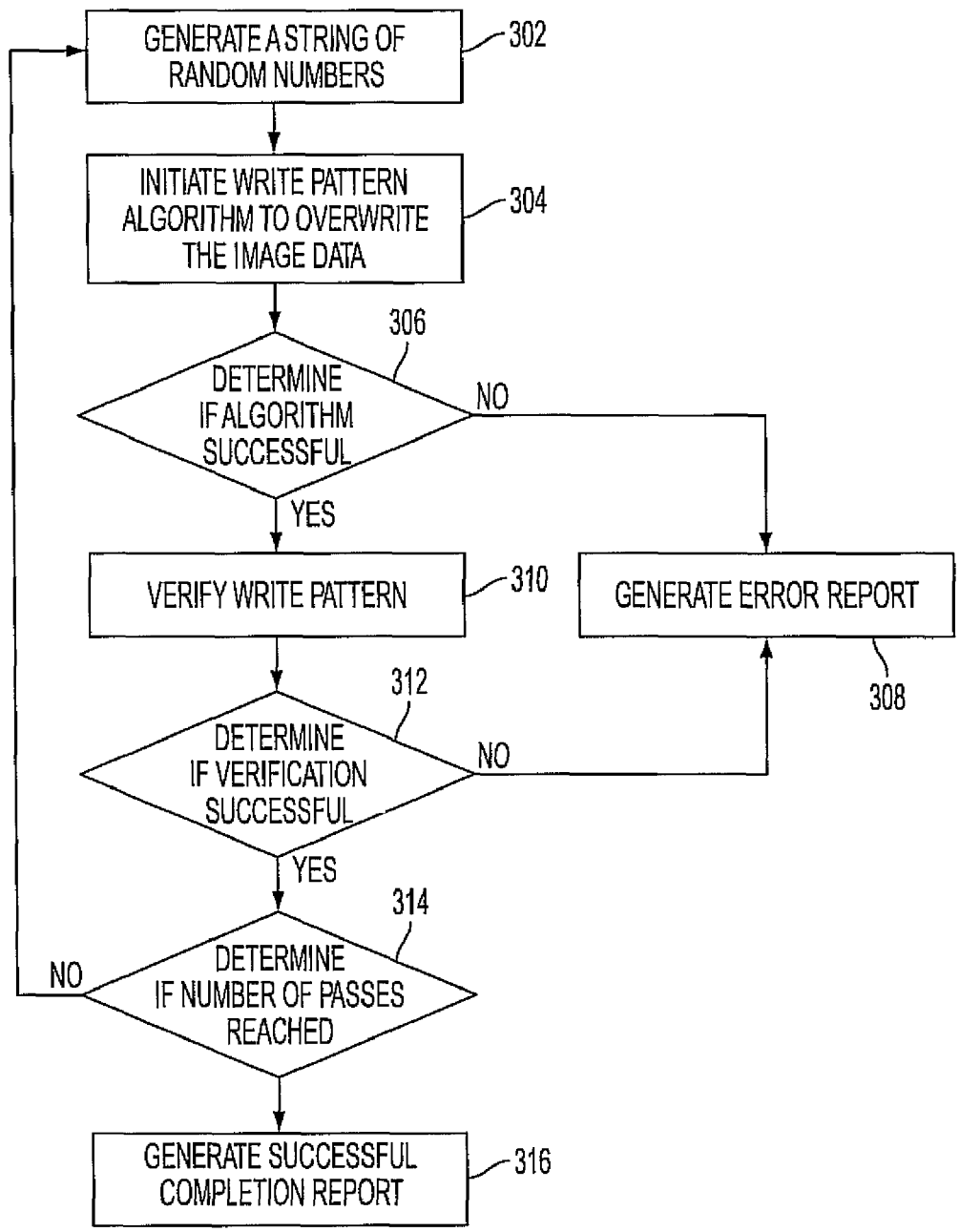
FIG. 3 depicts a flow diagram of an exemplary overwrite process, in accordance with systems and methods consistent with the present invention.

FIG. 3 depicts a flow diagram of an exemplary overwrite process, in accordance with systems and methods consistent with the present invention. The flow diagram will be described with reference to the embodiment of the image control unit depicted in FIG. 2. In step 302, image overwrite application 120 generates a string of random numbers. For example, image overwrite application 120 may use various well known random number generating functions that are known to those skilled in the art. The length of the string of random numbers may vary depending on various criteria. For example, the string of random numbers may be longer for images that are considered highly sensitive. Alternatively, images that are considered less sensitive may be overwritten with shorter strings of random numbers. Of course, any variety of random number strings may be employed by the present invention.

In step 304, image overwrite application 120 initiates an image write pattern algorithm to overwrite the image data with patterns from the string of random numbers. In one embodiment, the image write pattern algorithm includes converting the string of random numbers into a unique 2-byte value and using the 2-byte value to overwrite the image data. Of course, one skilled in the art will recognize that image overwrite application 120 may use different length values depending on the nature of the memory involved and/or the sensitivity of the image being overwritten.

Figure 4:
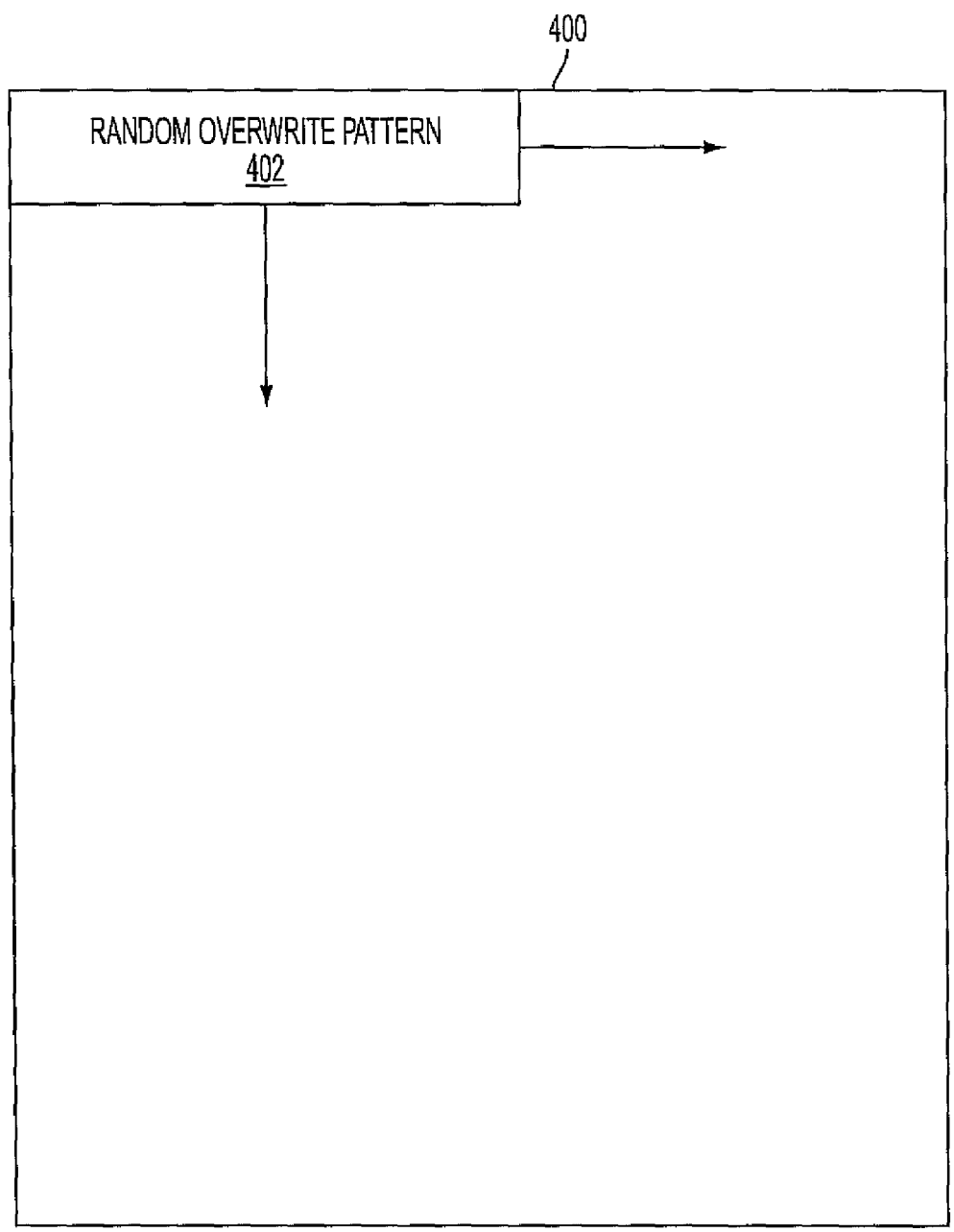
FIG. 4 depicts a block diagram of an exemplary embodiment of a page of overwritten image data, in accordance with systems and methods consistent with the present invention.

FIG. 4 depicts an exemplary embodiment of a page of overwritten image data, in accordance with systems and methods consistent with the present invention. As depicted, image data 400 is overwritten by random overwrite pattern 402. As discussed above, in one embodiment, random overwrite pattern 402 includes a unique 2-byte value formed from the string of random numbers.

Returning now back to FIG. 3, in step 306, image overwrite application 120 determines if the write pattern algorithm was successful. If it was not successful, then, in step 308, image overwrite application 120 generates an error report. The error report lists the error and can be printed out by printer 50 (FIG. 1). If successful, then in step 310 image overwrite application 120 verifies the write pattern. For example, image overwrite application 120 may read the image from memory and verifies that no artifact of the original image remains or that the image cannot be recovered.

In step 312, image overwrite application 312 next determines if the verification was successful. If the verification was not successful, then processing faults back to step 308 and image overwrite application 120 generates an error report, If the verification was successful, then, in step 314, image overwrite application 120 determines if the number of passes has been reached. In one embodiment, the number of passes can be selected by a user through UI control unit 107. In another embodiment, the number of passes can be pre-programmed. In one embodiment, image overwrite application 120 is configured to perform three passes by default.

If the image overwrite application 120 has not completed the required number of passes, then processing repeats back to step 302 and image overwrite application 120 generates another set of random numbers and repeats the image overwrite process. Once image overwrite application 120 has successfully completed the required number of passes, in step 316 it generates a successful completion report, which can be printed by printer 50.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An overwriting method for overwriting image data of an image stored in a non-volatile storage apparatus of an image forming apparatus, the method comprising:
receiving the image data;
storing the image data on a hard disk drive;
generating a set of random numbers, wherein a length of each of the set of random numbers is based on a sensitivity of the image data;
receiving, from a user, an indication of a category of image to be overwritten;
identifying a category of the image data;
determining, by an image overwrite application, that the category of the image data matches the category of image to be overwritten;
overwriting, in response to the determination, the image data with a set of patterns from the set of random numbers; and
verifying that the image cannot be recovered by attempting to read the overwritten image data from the hard disk drive.

2. The method of claim 1 wherein overwriting the image data comprises converting the set of random numbers into a 2-byte value.

3. The method of claim 2 wherein the set of patterns comprises the 2-byte value.

4. The method of claim 1 further comprising repeating the generating and overwriting a set number of times.

5. The method of claim 1 further comprising determining if the overwriting was successful.

6. The method of claim 5 further comprising generating an error report if the overwriting was unsuccessful.

7. The method of claim 5 further comprising generating a successful completion report if the overwriting was successful.

8. An image control unit for controlling an image forming apparatus, the image control unit comprising:
an image input control unit for receiving image data of an image;
a non-volatile storage apparatus for storing the image data;
a central processing unit; and
a memory comprising an overwrite application program configured for execution by the central processing unit and comprising instructions for: generating a set of random numbers, wherein a length of each of the set of random numbers is based on a sensitivity of the image data; receiving, from a user, an indication of a category of image to be overwritten; identifying a category of the image data; determining that the category of the image data matches the category of image to be overwritten; overwriting, in response to the determination, the image data with a set of patterns from the set of random numbers; and verifying that the image cannot be recovered by attempting to read the overwritten image data from the non-volatile storage apparatus.

9. The image control unit of claim 8 wherein the non-volatile storage apparatus comprises a hard disk drive.

10. The image control unit of claim 8 wherein the instructions further comprise converting the set of random numbers into a unique 2-byte value.

11. The image control unit of claim 10 wherein the set of patterns comprises the unique 2-byte value.

12. The image control unit of claim 8 wherein the instructions further comprise repeating the generating and overwriting a set number of times.

13. The image control unit of claim 8 wherein the instructions further comprise determining if the overwriting was successful.

14. The image control unit of claim 13 wherein the instructions further comprise generating an error report if the overwriting was unsuccessful.

15. The image control unit of claim 13 wherein the instructions further comprise generating a successful completion report if the overwriting was successful.

16. The image control unit of claim 8 further comprising a user interface control unit for receiving commands from a user.

17. An image forming apparatus comprising:
 an image reading apparatus for generating image data from an original image;
 a printer for printing copies of the image data;
 an image input control unit for receiving the image data;
 an image control unit comprising:
  a non-volatile apparatus for storing the image data;
  a central processing unit; and
  a memory comprising an overwrite application program configured for execution by the central processing unit and comprising instructions for generating a set of random numbers, wherein a length of each of the set of random numbers is based on a sensitivity of the image data; receiving, from a user, an indication of a category of image to be overwritten; identifying a category of the image data; determining that the category of the image data matches the category of image to be overwritten; overwriting, in response to the determination, the image data with a set of patterns from the set of random numbers; and verifying that the original image cannot be recovered by attempting to read the overwritten image data from the non-volatile apparatus.

* * * * *